United States Patent
Zheng

(10) Patent No.: US 7,080,653 B2
(45) Date of Patent: Jul. 25, 2006

(54) COLLAPSIBLE STORAGE DEVICES

(75) Inventor: Yu Zheng, Walnut, CA (US)

(73) Assignee: Patent Category Corp., Walnut, CA (US)

(*) Notice: Subject to any disclaimer, the term of this patent is extended or adjusted under 35 U.S.C. 154(b) by 241 days.

(21) Appl. No.: 10/243,621

(22) Filed: Sep. 13, 2002

(65) Prior Publication Data

US 2003/0070703 A1 Apr. 17, 2003

Related U.S. Application Data

(63) Continuation-in-part of application No. 09/696,909, filed on Oct. 26, 2000, now Pat. No. 6,499,498, which is a continuation-in-part of application No. 09/183,528, filed on Oct. 30, 1998, now Pat. No. 6,138,701, which is a continuation-in-part of application No. 09/056,729, filed on Apr. 7, 1998, now Pat. No. 6,032,685, which is a continuation-in-part of application No. 09/004,829, filed on Jan. 9, 1998, now Pat. No. 5,975,101, which is a continuation-in-part of application No. 08/717,408, filed on Sep. 20, 1996, now Pat. No. 5,941,265.

(51) Int. Cl.
*E04H 15/40* (2006.01)

(52) U.S. Cl. .......................... 135/126; 220/9.2; 383/33
(58) Field of Classification Search ................ 135/126, 135/128, 143, 145, 156; 220/9.4, 9.2, 9.3, 220/666; 190/107, 109, 110, 115, 124, 126, 190/127; 383/12, 33, 34, 38, 104, 117, 118
See application file for complete search history.

(56) References Cited

U.S. PATENT DOCUMENTS

| | | | | |
|---|---|---|---|---|
| 241,765 A * | 5/1881 | Wever | .......................... | 220/9.3 |
| 2,182,932 A * | 12/1939 | Sanford | ....................... | 220/9.3 |
| 2,375,819 A * | 5/1945 | Reid | ........................... | 108/115 |
| 2,558,995 A * | 7/1951 | Tullis | ............................. | 190/8 |
| 2,638,399 A * | 5/1953 | Seymour | ..................... | 312/297 |
| 3,625,235 A * | 12/1971 | Gorgichuk | ................... | 135/87 |
| 3,683,427 A * | 8/1972 | Burkholz et al. | .............. | 4/499 |
| 4,003,455 A * | 1/1977 | Cortese | ........................ | 190/8 |
| 4,723,371 A * | 2/1988 | Williams | ......................... | 43/1 |
| 4,917,160 A * | 4/1990 | Hart et al. | .................. | 150/106 |
| 4,974,621 A * | 12/1990 | Lerma | ......................... | 135/139 |
| 5,137,044 A * | 8/1992 | Brady | ......................... | 135/126 |
| 5,439,017 A * | 8/1995 | Brown | ......................... | 135/126 |

(Continued)

FOREIGN PATENT DOCUMENTS

EP 928864 * 7/1999

*Primary Examiner*—Janet M. Wilkens
(74) *Attorney, Agent, or Firm*—Raymond Sun

(57) ABSTRACT

A collapsible structure has first and second flexible loop members, each loop member defining a closed loop and having a first side and an opposing second side, each loop member adapted to assume an expanded position and a collapsed position, with the two loop members overlapping each other at a first overlapping point along the first sides of the loop members, and at a second overlapping point along the second sides of the loop members. The loop members are adapted to assume a deployed position in which one loop member is disposed at an angle with respect to the other loop member at the overlapping points, so that the structure defines a top side, four vertical sides, and a bottom side when in the loop members are in the deployed position. The structure also includes a flexible wall extending across the four vertical sides and the bottom side to define an interior space.

10 Claims, 5 Drawing Sheets

U.S. PATENT DOCUMENTS

| | | |
|---|---|---|
| 5,560,385 A | 10/1996 | Zheng |
| 5,667,066 A * | 9/1997 | Simpson ............... 206/278 |
| 5,800,067 A * | 9/1998 | Easter ................ 383/104 |
| D406,423 S | 3/1999 | Kellogg et al. |
| 5,964,533 A | 10/1999 | Ziglar |
| 5,971,188 A | 10/1999 | Kellogg et al. |
| 6,006,772 A | 12/1999 | Zheng |
| 6,092,544 A | 7/2000 | Zheng |
| D431,361 S | 10/2000 | Kellogg et al. |
| D433,810 S | 11/2000 | Kellogg et al. |
| D438,009 S | 2/2001 | Kellogg et al. |
| 6,220,998 B1 | 4/2001 | Kellogg et al. |
| D461,638 S | 8/2002 | Kellogg et al. |
| 6,494,335 B1 * | 12/2002 | Kellogg et al. ............ 220/9.3 |
| 6,585,414 B1 * | 7/2003 | Peska ................. 383/38 |

\* cited by examiner

COLLAPSIBLE STORAGE DEVICES

RELATED CASES

This is a continuation-in-part of Ser. No. 09/696,909, entitled "Collapsible Sunshields, Partitions and Shade Structures Having Overlapping Support Loops", filed Oct. 26, 2000, now U.S. Pat. No. 6,499,498 which is a continuation-in-part of Ser. No. 09/183,528, entitled "Collapsible Structures Having Overlapping Support Loops", filed Oct. 30, 1998, now U.S. Pat. No. 6,138,701, which is a continuation-in-part of Ser. No. 09/056,729, entitled "Collapsible Structures Having Overlapping Support Loops", filed Apr. 7, 1998, now U.S. Pat. No. 6,032,685, which is a continuation-in-part of Ser. No. 09/004,829, entitled "Collapsible Structures Having Overlapping Support Loops", filed Jan. 9, 1998, now U.S. Pat. No. 5,975,101, which is in turn a continuation-in-part of Ser. No. 08/717,408, entitled "Collapsible Sunshields, Partitions and Shade Structures Having Overlapping Support Loops", filed Sep. 20, 1996, now U.S. Pat. No. 5,941,265, whose disclosures are incorporated by this reference as though fully set forth herein.

BACKGROUND OF THE INVENTION

1. Field of the Invention

The present invention relates to collapsible structures, and in particular, to structures supported by collapsible loop members to form storage devices. These structures may be twisted and folded to reduce the overall size of the structure.

2. Background Art

A number of prior art shade or tent structures have been provided for a wide variety of uses, such as for camping, for shade, or for play by children. Examples of these shade structures are illustrated in U.S. Pat. No. 3,990,463 to Norman, U.S. Pat. No. 4,825,892 to Norman, U.S. Pat. No. 5,038,812 to Norman, and U.S. Pat. No. 5,467,794 and 5,560,385 both to the present inventor. Each of these shade structures also uses one or more resilient loop members to support the structure in an expanded configuration. These shade structures may be twisted and folded to reduce the overall size of the shade structure.

In addition to sunshields and shade structures, there are also other collapsible structures that are provided for amusement purposes. Examples of such structures are illustrated in the present inventor's U.S. Pat. No. 5,722,446. Each of these structures also use one or more resilient loop members to support the structure in an expanded configuration. These structures may also be twisted and folded to reduce the overall size of the structure.

The wide-ranging uses for these collapsible structures can be attributed to the performance, convenience and variety that these structures provide. When fully expanded, these structures are stable and can be used for their intended applications without the fear of collapse. These structures are easily twisted and folded into a compact configuration to allow the user to conveniently store the structures. The light-weight nature of the materials used to make these structures makes it convenient for them to be moved from one location to another. These structures also provide much variety in use and enjoyment.

SUMMARY OF THE INVENTION

It is an object of the present invention to provide collapsible objects and structures that are different from those mentioned above, and which offer the user added applications for use.

It is another object of the present invention to provide a collapsible storage device.

The collapsible structure according to the present invention has first and second flexible loop members, each loop member defining a closed loop and having a first side and an opposing second side, each loop member adapted to assume an expanded position and a collapsed position, with the two loop members overlapping each other at a first overlapping point along the first sides of the loop members, and at a second overlapping point along the second sides of the loop members. The loop members are adapted to assume a deployed position in which one loop member is disposed at an angle with respect to the other loop member at the overlapping points, so that the structure defines a top side, four vertical sides, and a bottom side when in the loop members are in the deployed position. The structure also includes a flexible wall extending across the four vertical sides and the bottom side to define an interior space, and a handle provided adjacent at least one of the four vertical sides. The structure can also include a dividing wall provided in the interior space to divide the interior space into two or more compartments.

In another embodiment, the collapsible structure also includes overlapping third and fourth loop members that have the same construction as the first and second loop members. The first, second, third and fourth loop members are adapted to assume a deployed position in which the first and second loop members are disposed at an angle with respect to each other at the first and second overlapping points, and the third and fourth loop members are disposed at an angle with respect to each other at third and fourth overlapping points, with the overlapping first and second loop members positioned adjacent the overlapping third and fourth loop members and positioned in a manner such that the structure defines a top side, four vertical sides, and a bottom side when in the first, second, third and fourth loop members are in the deployed position. A flexible wall also extends across the four vertical sides and the bottom side to define an interior space.

BEST MODES FOR CARRYING OUT THE INVENTION

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 1:
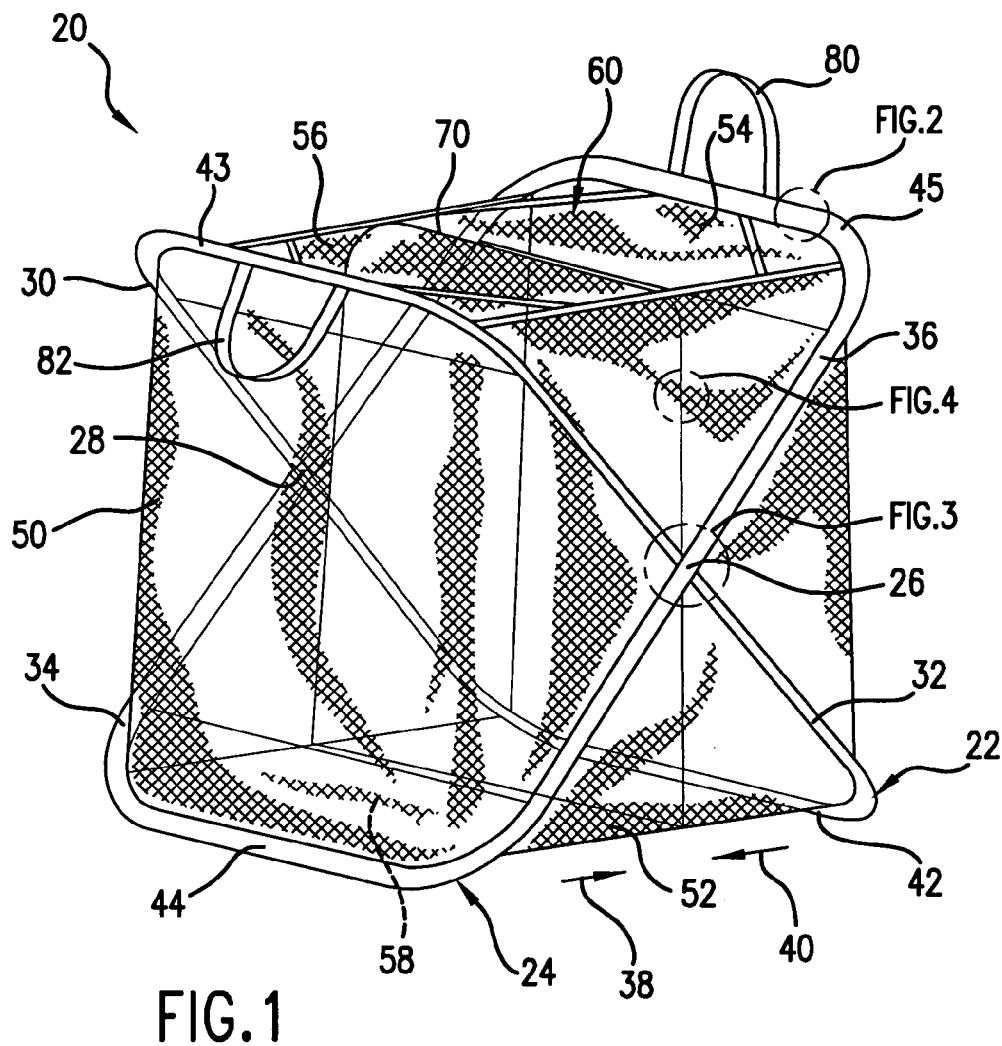
FIG. 1 is a perspective view of a collapsible structure according to one embodiment of the present invention illustrated in an expanded configuration.
Figure 2:
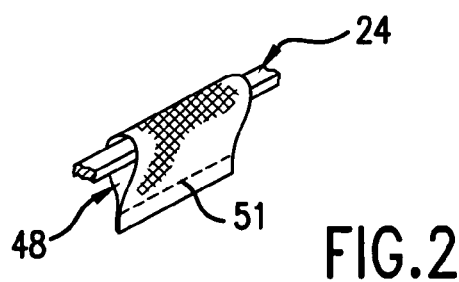
FIG. 2 is an expanded cut-away view of the section labeled 2 in FIG. 1.
Figure 3:
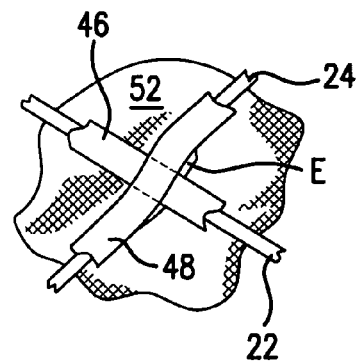
FIG. 3 is an expanded cut-away view of the section labeled 3 in FIG. 1.

FIGS. 1–3 illustrate a collapsible structure 20 according to one embodiment of the present invention. The structure 20 is illustrated as being embodied in the form of a storage device, such as a collapsible hamper that can be used to store any desired object, such as but not limited to laundry, toys, clothes, and garbage. The structure 20 has two overlapping or crossing resilient loop members 22 and 24 that together define the outer boundaries of the walls of the structure 20. Referring to FIG. 1, each loop member 22 and 24 is provided as a closed resilient loop, either as a closed continuous loop or as a strip of material with both ends held together by a retaining connector or other conventional attachment mechanism to form a closed loop. Each loop member 22 and 24 is preferably formed of flexible coilable steel having a memory, although other materials such as plastics may also be used. The loop members should be made of a material which is relatively strong and yet is flexible to a sufficient degree to allow it to be coiled. Thus, each loop member 22 and 24 is capable of assuming two positions or orientations, an open or expanded position such as shown in FIG. 1, or a folded position in which the loop member is collapsed into a size which is much smaller than its open position (see FIG. 6E). Each loop member 22 and 24 can be substantially equal in size and symmetrically disposed, but it will be appreciated by those skilled in the art that the resilient loop members 22 and 24 may assume any variety of shapes and sizes, including but not limited to circular, polygonal or oval. Both loop members 22 and 24 can even be provided in different sizes.

As illustrated in FIG. 1, the two loop members 22 and 24 overlap or cross-over each other at overlapping points 26 and 28. In one non-limiting embodiment, the left side 30 of the first loop member 22 is interior to the left side 34 of the second loop member 24, and the right side 32 of the first loop member 22 is interior to the right side 36 of the second loop member 24, so that the first loop member 22 is completely contained within the second loop member 24. The overlapping point 28 is defined by the intersection or crossing of the left sides 30 and 34 of loop members 22 and 24, respectively, and the overlapping point 26 is defined by the intersection or crossing of the right sides 32 and 36 of loop members 22 and 24, respectively. The overlapping points 26 and 28 can be positioned anywhere along the left and right sides 30, 32, 34, 36 of the loop members 22, 24, although they are shown as being positioned at about the center of the left and right sides 30, 32, 34, 36 in the structure 20 in FIG. 1. The two overlapping loop members 22 and 24 are pivotable about their overlapping points 26 and 28 between two positions, a first open position (see FIG. 1) in which both loop members 22 and 24 are disposed at an angle with respect to each other, and a second folded position (see FIG. 6A) in which the loop members 22 and 24 are folded towards each other (such as in the direction of arrows 38 and 40 in FIG. 1) to overlie each other in generally the same plane. When in the first open position, the bottom sides 42 and 44 of the loop members 22 and 24, respectively, are adapted to rest on a surface to form a supporting base for the structure 20. In contrast, when in the second folded position, the bottom sides 42 and 44 (and the top sides 43 and 45) of the loop members 22 and 24, respectively, are urged against each other.

Each loop member 22 and 24 is retained in a separate loop retaining sleeve that extends around the entire loop member. Referring to FIGS. 2 and 3, first and second loop retaining sleeves 46 and 48 are provided for the loop members 22 and 24, respectively, and are stitched to a fabric wall 52, which is described in greater detail hereinbelow. Each sleeve 46, 48 may be formed by folding a piece of fabric and applying a stitching 51. The structure of the sleeves 46 and 48 at the overlapping points 26 and 28 can be provided in one of several ways. In one embodiment, as shown in FIG. 3, the first sleeve 46 is closed at the location of the overlapping point 26, while the second sleeve 48 is slightly exposed (see designation "E" in FIG. 3) at the overlapping point 26 so that the loop member 24 is exposed thereat. Alternatively, a small portion of the sleeves 46, 48 may be interrupted or disconnected adjacent the overlapping points 26 and 28 so as to expose the loop members 22 and 24 at these overlapping points 26 and 28. According to yet another alternative, the sleeves 46 and 48 can be connected to each other to form a "+" or cross-shaped sleeve portion at the overlapping points 26 and 28. According to a further alternative, the respective sleeves 46, 48 can be provided as completely closed sleeves that run uninterrupted throughout the closed loop of the loop members 22 and 24.

Thus, in each alternative, the loop members 22 and 24 are not connected or attached at the overlapping points 26 and 28 so as to allow the loop members 22 and 24 to pivot about these points. In addition, in each alternative, the loop members 22 and 24 pivot about the overlapping points 26 and 28 in the two directions illustrated by arrows 38 and 40 in FIG. 1, with the overlapping points 26 and 28 together acting as hinge mechanisms when the loop members 22 and 24 are simultaneously pivoted about these points 26 and 28.

The loop members 22, 24 may be merely retained within the respective retaining sleeves 46, 48 without being connected thereto. Alternatively, the retaining sleeves 46, 48 may be mechanically fastened, stitched, fused, or glued to the respective loop members 22, 24 to retain them in position.

The structure 20 has five fabric walls 50, 52, 54, 56 and 58 that are supported by the loop members 22, 24, when the structure 20 is in the open position, to form an enclosed space. The walls 50, 52, 54, 56 form the four vertical sides of the structure 20, with the wall 58 forming the floor or bottom wall. The walls 50, 52, 54, 56, 58 define an interior storage space for the structure 20. The top of the structure 20 can be devoid of fabric (or provided with a small fabric border) to define at least one opening 60 through which objects can be introduced into the interior of the structure 20. The first and second sleeves 46, 48 are attached directly, such as by stitching or sewing, to the surfaces of the fabric walls 50, 52, 54, 56, 58 in a manner such that the sleeves 46, 48 define two of the sides for each of the fabric walls 50, 54 and 58. In particular, the vertical wall 50 has a first side (the top side 43) that is defined by a side of the sleeve 46 and its loop member 22, and a second side (the bottom side 44), opposite to the first side, that is defined by a side of the sleeve 48 and its loop member 24. Similarly, the vertical wall 54 has a first side (the top side 45) that is defined by a side of the sleeve 48 and its loop member 24, and a second side (the bottom side 42), opposite to the first side, that is defined by a side of the sleeve 46 and its loop member 22. Similarly, the bottom wall 58 has a first side that is defined by a side of the sleeve 48 and its loop member 24, and a second side, opposite to the first side, that is defined by a side of the sleeve 46 and its loop member 22. In addition, the sleeves 46, 48 are attached (such as by stitching) to the surface of the fabric walls 52 and 56, where the overlapping points 26 and 28 are provided.

When the structure 20 is in its fully deployed configuration shown in FIG. 1, the fabric walls 50, 52, 54, 56, 58 define the limits to which the two loop members 22, 24 can be pivoted away from each other (i.e., pivoted away in directions that are opposite to the directions of arrows 38, 40).

The fabric walls 50, 52, 54, 56, 58 are preferably made from strong, lightweight materials and may include woven fabrics, sheet fabrics or even films. For example, the fabric shown in FIG. 1 is illustrated as being a meshed material. The fabric should be water-resistant and durable to withstand the wear and tear associated with rough treatment by children.

Figure 5:
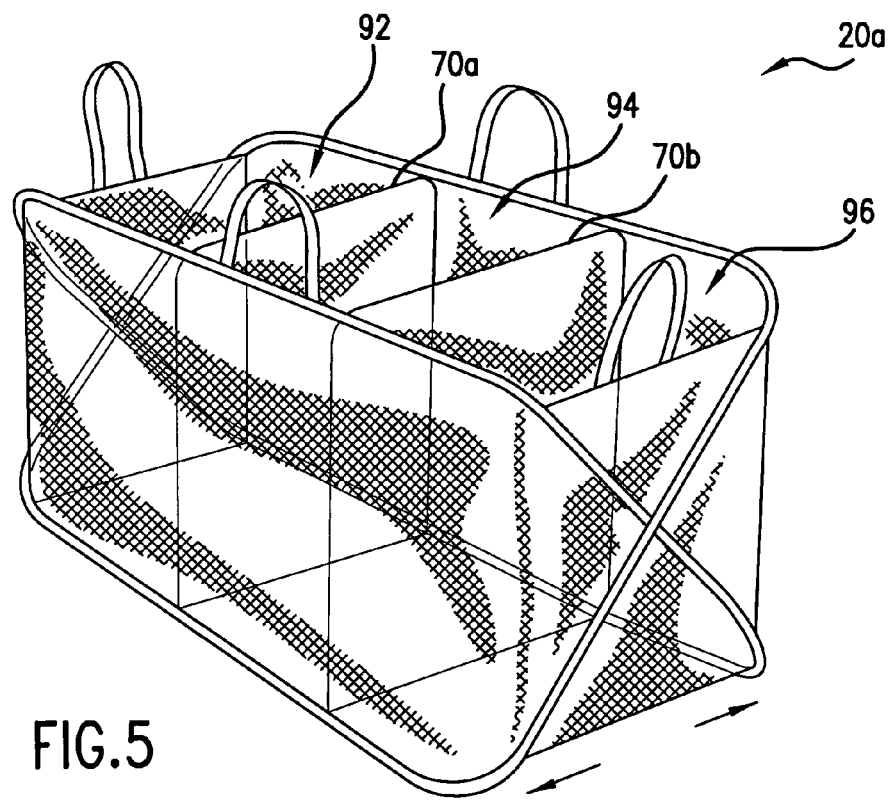
FIG. 5 is a perspective view illustrating a modification made to the structure of FIG. 1.

A dividing wall 70 is provided in the interior space of the structure 20. The dividing wall 70 can be a piece of fabric material having opposing sides that are stitched to the fabric walls 52 and 56, to divide the interior space into two smaller compartments or spaces. Although FIG. 1 illustrates the provision of one dividing wall 70, any number (e.g., two or more) of dividing walls 70 can be provided to divide the interior space into more than two separate compartments. For example, FIG. 5 illustrates a structure 20*a* that can have the same construction as the structure 20 in FIG. 1, except that two dividing walls 70*a* and 70*b* are provided to define three separate spaces 92, 94 and 96.

Figure 4:
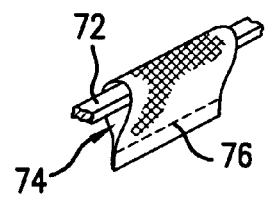
FIG. 4 is an expanded cut-away view of the section labeled 4 in FIG. 1.

Alternatively, the dividing wall 70 can be provided in the form of a collapsible panel having an outer boundary defined by a loop member 72 that can be the same as the loop members 22, 24. Referring to FIGS. 1 and 4, a peripheral loop retaining sleeve 74 is provided along and traverses the peripheral edges of the dividing wall 70, and a continuous loop member 72 is retained or held within the sleeve 74 such that the loop member 72 extends completely around the peripheral edges. A fabric or other sheet material 76 extends across the interior space defined by the sleeve 74, and is held taut by the loop member 72 when the dividing wall 70 is in its opened position as shown in FIG. 1. The fabric or sheet material 76 can be the same as the fabric material used for any of the walls 50, 52, 54, 56, 58.

A pair of loops or straps 80 and 82 can be attached to the top sides 45 and 43, respectively, to function as handles that can be used by the user to lift and carry the structure 20 when the structure 20 is in the opened or expanded position as shown in FIG. 1.

Figure 6A:
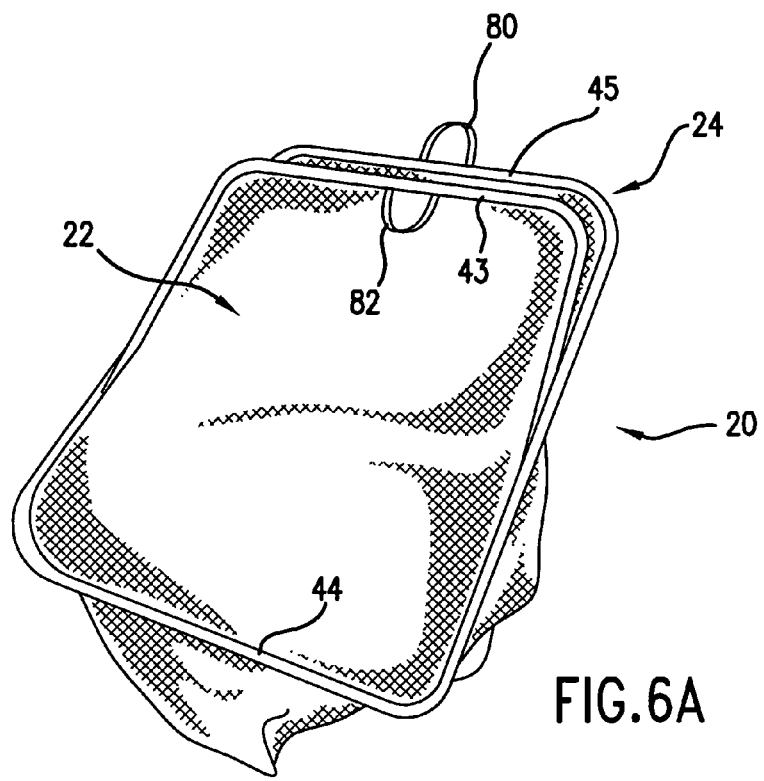
FIGS. 6A–6E illustrate how the structure of FIG. 1 is collapsed and folded to a reduced size.
Figure 6B:
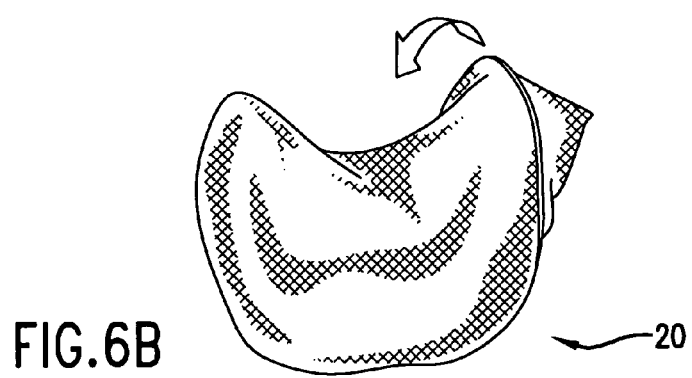
Figure 6C:
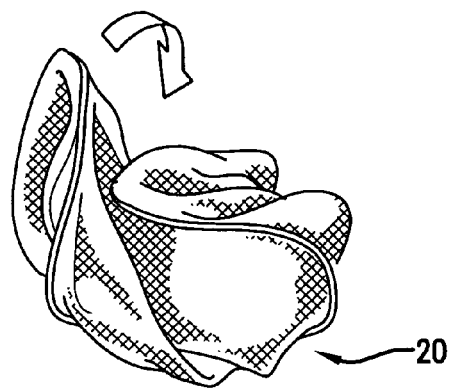
Figure 6D:
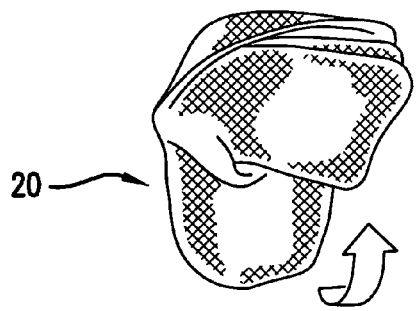
Figure 6E:
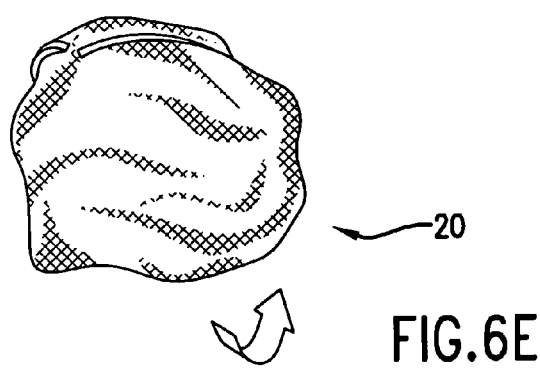

FIGS. 1 and 6A through 6E describe the various steps for folding and collapsing the structure 20 of FIG. 1 for storage. The first step consists of urging or folding the two loop members 22 and 24 towards each other (as shown by arrows 38 and 40 in FIG. 1) about the hinging mechanism of the overlapping points 26, 28. The fabric walls 50, 52, 54, 56, 58 and the dividing wall 70 collapse onto each other as the loop members 22 and 24 are urged against each other, as shown in FIG. 6A. In the embodiment where the dividing wall 70 is made up of a panel that has its own loop member 72, the panel will be collapsed between the two loop members 22, 24, and can be folded together with the folding of the loop members 22, 24 described below. When the two loop members 22 and 24 are urged together, the next step, shown in FIG. 6B, is to twist and fold the combined structure 20 to initially collapse the loop members and fabric into a smaller diameter. This can be followed by folding in the opposite side of the combined structure 20 upon the previous fold to further collapse the combined loop members (see FIG. 6C). As shown in FIG. 6D, the folding and collapsing is continued so that the size of the structure 20 is a fraction of the diameter of the initial structure. FIG. 6E shows the loop members 22, 24 and fabric walls 50, 52, 54, 56, 58 collapsed on each other to provide for a small essentially compact configuration having a plurality of concentric closed loop rings and layers of fabric so that the collapsed structure has a size which is a fraction of the original size of the structure 20.

To deploy the structure 20 back to the expanded, fully deployed position, the loop members 22 and 24 are unfolded. The resiliency and spring force of the loop members 22, 24 (and 72) will cause the loop members 22, 24 (and 72) to spring open to the expanded configuration. The loop members 22, 24 can then be pivoted about their hinged overlapping points 26, 28 to deploy the structure 20 in its original expanded configuration. When the loop members 22, 24 are fully deployed, the fabric walls 50, 52, 54, 56, 58 (and 76) will assume their respective positions with respect to the supporting loop members 22, 24 (and 72).

Figure 7:
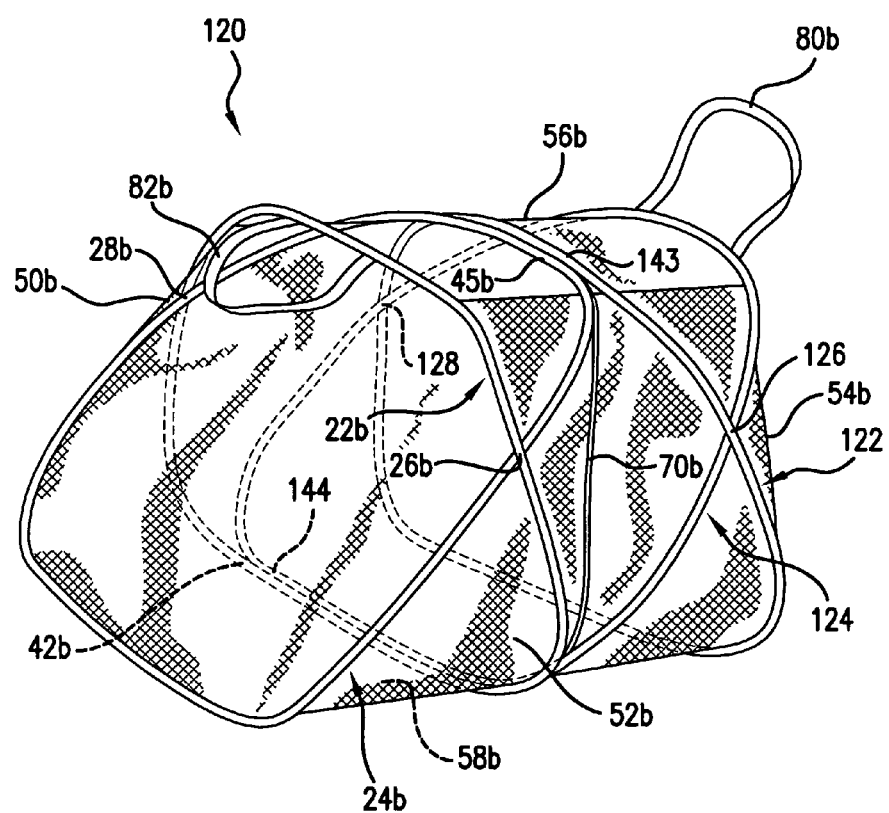
FIG. 7 is a perspective view of a collapsible structure according to another embodiment of the present invention illustrated in an expanded configuration.

FIG. 7 illustrates another embodiment 120 of the present invention, where the structure 20 in FIG. 1 can be modified to incorporate another pair of overlapping loop members 122 and 124. In FIG. 7, the structure 120 has a first pair of overlapping loop members 22*b* and 24*b* that can have the same construction as the loop members 22 and 24 described above, to define the same overlapping points 26*b* and 28*b* as the overlapping points 26 and 28 described above. In addition, the structure 120 has a second pair of overlapping loop members 122 and 124 that can have the same construction as the loop members 22 and 24 described above, to define the same overlapping points 126 and 128 as the overlapping points 26 and 28 described above. In the structure 120, the top side 45*b* of the loop member 24*b* can be attached to the top side 143 of the loop member 122, and the bottom side 42*b* of the loop member 22*b* can be attached to the bottom side 144 of the loop member 124. These attachments can be accomplished, for example, by stitching the respective loop retaining sleeves for the loop members 24*b* and 122, and the respective loop retaining sleeves for the loop members 22*b* and 124.

The structure 120 also has five fabric walls 50*b*, 52*b*, 54*b*, 56*b* and 58*b* (which can be the same as the fabric walls 50, 52, 54, 56, 58) that are supported by the loop members 22*b*, 24*b*, 122, 124 when the structure 120 is in the open position, to form an enclosed space. The walls 50*b*, 52*b*, 54*b*, 56*b* form the four vertical sides of the structure 120, with the wall 58*b* forming the floor or bottom wall. The walls 50*b*, 52*b*, 54*b*, 56*b*, 58*b* also define an interior storage space for the structure 120. When the structure 120 is in its fully deployed configuration shown in FIG. 7, the fabric walls 50*b*, 52*b*, 54*b*, 56*b*, 58*b* define the limits to which the four loop members 22*b*, 24*b*, 122, 124 can be pivoted away from each other.

A dividing wall 70*b* can also be provided in the interior space of the structure 120. The dividing wall 70*b* can be a piece of fabric material having opposing sides that are stitched to the fabric walls 52*b* and 56*b*, to divide the interior space into two smaller compartments or spaces. Alternatively, the dividing wall 70*b* can be provided in the form of a collapsible panel having an outer boundary defined by a loop member, as described above. A pair of loops or straps 80*b* and 82*b* can be attached to the top sides of the loop members 124 and 22*b*, respectively, to function as handles that can be used by the user to lift and carry the structure 120 when the structure 120 is in the expanded position as shown in FIG. 7.

The additional set of overlapping loop members 122, 124 allows the structure 70*b* to be configured in an elongated manner (i.e., having a greater length), and also provides additional stability of the structure 120 when the structure is deployed in the fully deployed configuration shown in FIG. 7.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A collapsible structure, comprising:
   first and second flexible loop members, each loop member defining a closed loop and having a first side and an opposing second side, each loop member adapted to assume an expanded position and a collapsed position, with the two loop members overlapping each other at a first overlapping point along the first sides of the loop members, and at a second overlapping point along the second sides of the loop members;
   wherein the loop members are adapted to assume a deployed position in which one loop member is disposed at an angle with respect to the other loop member at the overlapping points, so that the structure defines a top side, four vertical sides, and a bottom side when the loop members are in the deployed position;
   a flexible wall extending across the four vertical sides and the bottom side to define an interior space;
   a dividing wall extending across the internal cross-section of the interior space to divide the interior space into two or more compartments;
   wherein the top side is devoid of fabric material and has an opening; and
   wherein the dividing wall comprises a panel having an outer periphery, and a collapsible loop member that defines the outer periphery of the panel.

2. The structure of claim 1, further including a handle provided adjacent at least one of the four vertical sides.

3. The structure of claim 1, wherein the dividing wall is attached to the wall of two of the vertical sides.

4. The structure of claim 1, further including first and second loop retaining sleeves for retaining the first and second loop members, respectively.

5. A collapsible structure, comprising:
   first and second flexible loop members, each loop member defining a closed loop and having a first side and an opposing second side, each loop member adapted to assume an expanded position and a collapsed position, with the first and second loop members overlapping each other at a first overlapping point along the first sides of the first and second loop members, and at a second overlapping point along the second sides of the first and second loop members;
   third and fourth flexible loop members, each of the third and fourth loop members defining a closed loop and having a first side and an opposing second side, each of the third and fourth loop members adapted to assume an expanded position and a collapsed position, with the third and fourth loop members overlapping each other at a third overlapping point along the first sides of the third and fourth loop members, and at a fourth overlapping point along the second sides of the third and fourth loop members;
   wherein the first, second, third and fourth loop members are adapted to assume a deployed position in which the first and second loop members are disposed at an angle with respect to each other at the first and second overlapping points, and the third and fourth loop members are disposed at an angle with respect to each other at the third and fourth overlapping points, with the overlapping first and second loop members positioned adjacent the overlapping third and fourth loop members and positioned in a manner such that the structure defines a top side, four vertical sides, and a bottom side when the first, second, third and fourth loop members are in the deployed position; and
   a flexible wall extending across the four vertical sides and the bottom side to define an interior space.

6. The structure of claim 5, further including a handle provided adjacent at least one of the four vertical sides.

7. The structure of claim 5, wherein the top side has an opening.

8. The structure of claim 7, wherein the top side is devoid of fabric material.

9. The structure of claim 5, further including a dividing wall provided in the interior space to divide the interior space into two or more compartments.

10. The structure of claim 5, wherein the first side of the first loop member is coupled to the first side of the fourth loop member, and the second side of the second loop member is coupled to the second side of the third loop member.

* * * * *